United States Patent [19]

Crane et al.

[11] Patent Number: 4,581,527

[45] Date of Patent: Apr. 8, 1986

[54] DAMAGE ASSESSMENT SYSTEM FOR COMPOSITE PLASTIC STRUCTURES USING FIBER OPTICS

[75] Inventors: Roger M. Crane, Baltimore; Aleksander B. Macander, Rockville, both of Md.

[73] Assignee: The United States of America as represented by the Secretary of the Navy, Washington, D.C.

[21] Appl. No.: 518,715

[22] Filed: Jul. 29, 1983

[51] Int. Cl.[4] ............................................. H01J 5/16
[52] U.S. Cl. ................................... 250/227; 350/96.1
[58] Field of Search ...................... 250/227, 221, 222.1; 340/550, 555, 556, 557; 350/96.1, 96.34, 96.15

[56] References Cited

U.S. PATENT DOCUMENTS

| | | | |
|---|---|---|---|
| 3,407,304 | 10/1968 | Kinard et al. | 250/227 |
| 4,197,454 | 4/1980 | Knutsen | 250/227 |
| 4,234,875 | 11/1980 | Williams | 340/550 |
| 4,320,292 | 3/1982 | Oikawa et al. | 250/227 |
| 4,367,460 | 1/1983 | Hodara | 340/550 |
| 4,399,430 | 8/1983 | Kitchen | 250/227 |
| 4,537,469 | 8/1985 | Kircher | 350/96.1 |

*Primary Examiner*—David C. Nelms
*Attorney, Agent, or Firm*—Robert F. Beers; Luther A. Marsh; Roger L. Maxwell

[57] ABSTRACT

A damage assessment system consisting of a three-dimensional grid of optical fibers for locating and assessing damage in plastic composite structures. A optical fiber grid system is implanted in a composite structure during its fabrication and becomes integrated with it. The optical fiber grid experiences an identical load/damage condition as the structure itself. Using a system of interrogation based on optoelectronics, passage or continuity of light throughout the system can be monitored for light attenuation or interruption. Highly stressed fibers would attenuate light while broken fibers would interrupt or hinder light transmission. By monitoring a number of optical fiber ends, the extent of damage in three dimensions can be determined.

5 Claims, 2 Drawing Figures

DAMAGE ASSESSMENT SYSTEM FOR COMPOSITE PLASTIC STRUCTURES USING FIBER OPTICS

BACKGROUND OF THE INVENTION

1. Field of the Invention

This invention relates to a damaged assessment system for plastic structures and more particularly to a damage assessment system for fiber reinforced plastic structures having a three-dimensional optical fiber grid as an integral part of the structure.

2. Description of the Prior Art

Fiber reinforced plastic (FRP) composite materials, such as glass reinforced plastics (GRP), are increasingly being used for structural applications due to their attractive material properties, such as high strength and stiffness to weight ratios. In some applications, the structure may be of considerable size, with a large projecting surface area which is prone to various kinds of mechanical damage. To insure the structural integrity of these structures, it is important to nondestructively inspect them during their service life.

However, in applications, such as sonar domes on submarines, inspection is an inconvenient and time-consuming operation. It usually requires that the vessel cease operations to perform the tests, which is a distinct disadvantage for a military ship on patrol. Visual inspection is not always accurate since an impact may cause internal damage to the material, such as delamination, which is not apparent from the outer surface. Hand held ultrasonic units for scanning may be used, but are very time consuming and not definitive. Since sonar domes are particularly vulnerable to foreign object impact, and since its integrity is vital to the mission of the ship, present inspection methods of FRP sonar domes are inadequate to allow military ships to function on patrol as required. Likewise, in other applications, inspection methods are time consuming, expensive, and not accurate.

SUMMARY OF THE INVENTION

The present invention provides an improved damage assessment system by including a grid of breakable optical fibers in the body of the FRP composite structure during fabrication. The optical fibers indicate the presence, location, and extent of damage to the structure by being fractured when severe damage to the structure occurs. Once fractured, the optical fibers do not transmit light and are thus distinguished from the light transmitting undamaged fibers.

Accordingly, one object of the invention is to provide an improved damage assessment system.

Another object of the invention is to provide an improved damage assessment system which is reliable, yet easy to operate.

A further object of the invention is to provide an inexpensive damage assessment system.

A still further object of the invention is to provide a damage assessment system which may be operated without shutting down the apparatus it is assessing.

Another object of the invention is to provide a damage assessment system which may detect hidden damage and measure the extent of damage in three dimensions.

DESCRIPTION OF THE PREFERRED EMBODIMENT

Figure 1:
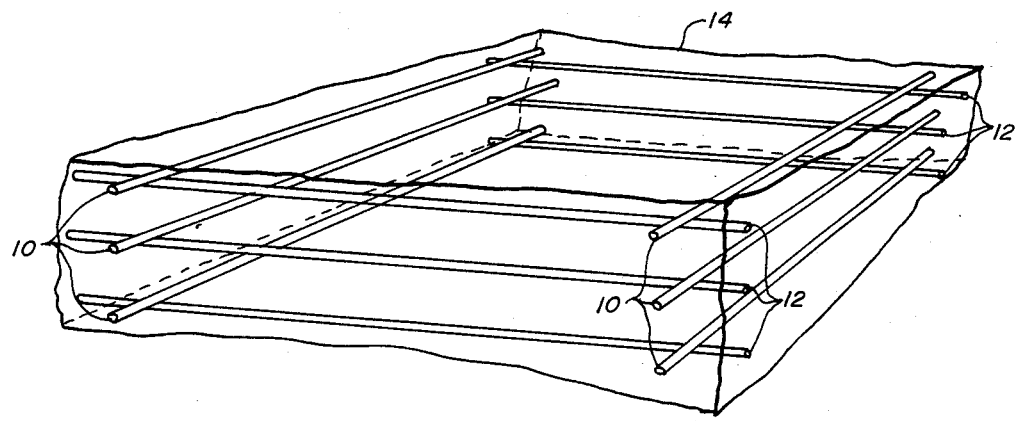
FIG. 1 is a perspective view of the material of the invention.

Referring now to the drawings wherein like reference characters designate identical or corresponding parts throughout the several views and more particularly to FIG. 1, wherein the arrangement of optical fibers in the FRP material, 14, is shown as including a series of optical fibers 10 extending in a first direction within the FRP material. The fibers are placed at specific depths within the material and at specific distances apart horizontally. Thus, a group of fibers lie above each other all at a distance from a similar group lying at the same depth.

Similarly, a second series of optical fibers 12 extend through the FRP material in a direction perpendicular to the fibers 10. These fibers are also arranged in groups at specific distances apart with the fibers being at the same depth as the fibers in series 10. The result is a series of planes within the material with each plane containing a gridwork of fibers in orthogonal directions.

Figure 2:
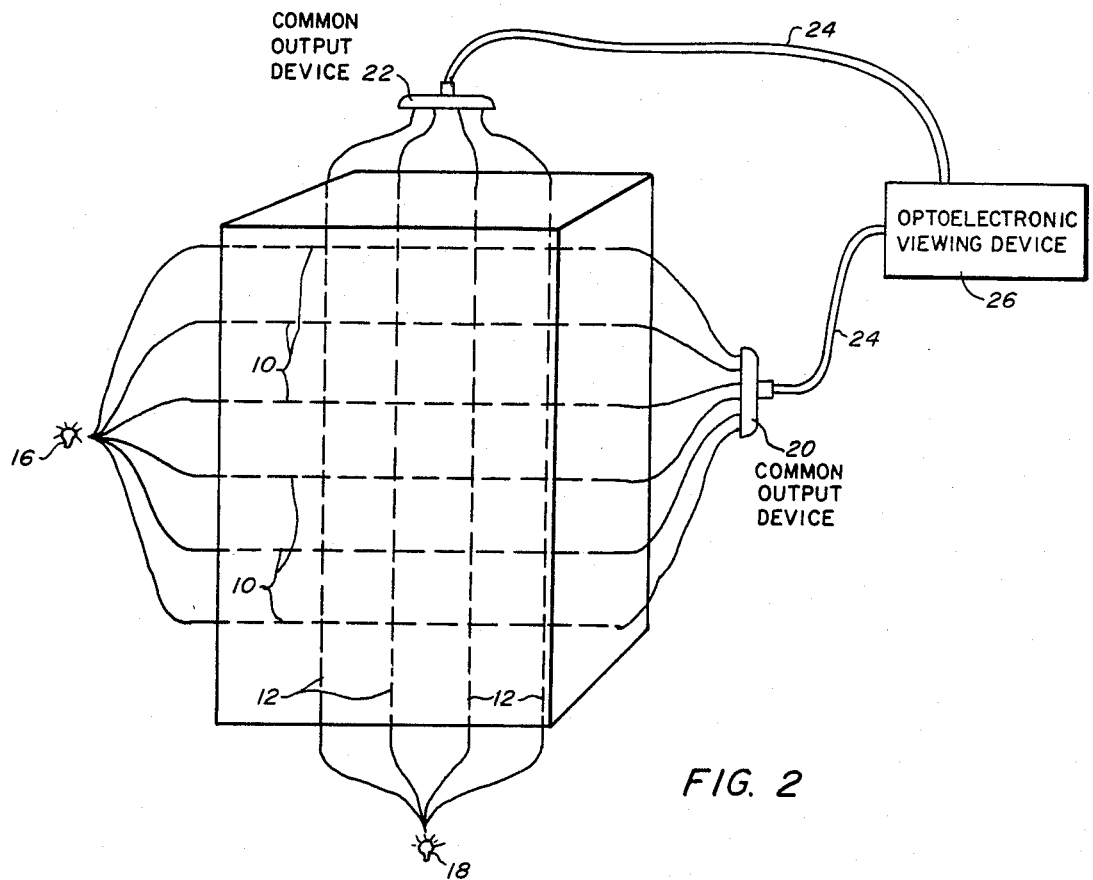
FIG. 2 is a schematic of the invention.

FIG. 2 shows one such plane having a series of fibers 10 in a first direction and a series of fibers 12 in a second direction. One end of each of the fibers in series 10 is connected together to a common input. A light source 16 produces light which shines into the common input and through each of the fibers 10. Likewise, one end of each of the fibers in series 12 is connected together near a light source 18.

The opposite ends of the fibers of series 10 are connected to a common output device 20. Likewise, the opposite ends of the fibers of series 12 are connected to a common output device 22. These output devices are used to receive the light from the output end of the fibers and to forward a signal indicative of the presence or absence of light through cables 24 to an optoelectronic viewing device 26.

The output devices may merely be an optical fiber connector, with single fibers in the material being connected to one of the fibers in a cable through the connector. In this case, the signal is an optical one, just an extension of the original signal.

The output devices may also be devices to convert light signals to electrical signals, such as photocells, so that electrical signals are carried along cable 24 and reconverted to some form of visual display in viewing device 26.

In operation, the various optical fiber series form layers of two dimensional grids throughout the FRP material. If the material is part of a structure, such as a sonar dome on a submarine, then the grids follow the curvature of the surface of the dome, and the layers are located at various depths from the surface. If the material is damaged due to collision, explosion, excessive pressure or any of the other dangers on a submarine, the optical fibers in the damaged region will also be broken. Optical fibers which are broken will not carry light from the input light source to the output device, and hence appear dark at the output end, when light is present at the input. Thus, when light is present at the input to a series of fibers, the output ends of all fibers in the series will be light except for those in the damaged area which appear dark. Thus, the width and location of the damaged area is determined by the dark fibers in one series.

If the other series in the same layer has light input at the same time, the location and extent of the damaged area in two directions can be quickly determined by observing the dark fibers in both series.

Likewise, if this two-directional determination is performed in each of the several layers, the variation in the extent of the damage in different layers is determined and thus the extent of damage in the thickness direction is also determined.

While the fibers are shown as being equally spaced, the spacings may be greater in either direction or even nonuniform in both directions. It is only necessary that the position of each fiber be known so that a broken fiber indicates only a single position in one direction. Thus, it may be advantageous to group the fibers closer in areas that are more susceptible to damage or are more indicative as to the integrity of the structure. Likewise, the fibers need not be directly above each other, although computation is easier if they were.

The light source may be any convenient light producing object, such as a light bulb shining through a slot or hole in a housing which holds the input ends of the fibers. Other space saving light sources such as light emitting diodes may also be used. The input ends of the fiber may be connected together with an optical fiber connector having a single input, if desired or merely bundled together to form an input surface.

The output device may merely connect an optical cable to the fibers or device to convert to electrical signals. Correspondingly, the cables may be electrical, optical or any other signal carrier. If convenient, a single output device could be used for both directions or plural layers.

The viewing device may display the output signals in any convenient and understandable display. One convenient display includes a two dimensional field of dots with the number of rows of dots equal to the number of layers and the number of columns equal to the number of fibers in a series. Thus the dots would be an analog to viewing the fiber ends along one side of the structure. A second field would represent the other series of fibers.

If the signals from the output device are electrical, the viewing device may include a computer for receiving the signals and producing a three-dimensional picture of the material with the damaged area indicated. The amount of cable used may be reduced if an interrogating device is included in the output device and viewing device to sequentially examine each fiber and send the results sequentially over a single wire or fiber cable.

This type of system allows a simple test of the integrity of the structure which is nondestructive, which may be performed without interfering with the operation of the structure and which gives indications in three dimensions of damage suffered which may not be visible from the surface of the material. The system has applicability to any FRP composite material which is exposed to danger of injury such as sonar domes and propellers on ships.

Obviously, many modifications and variations of the present invention are possible in light of the above teaching. It is therefore to be understood that within the scope of the appended claims, the invention may be practiced otherwise than as specifically described.

What is claimed is:

1. A damage assessment system for fiber reinforced composite material comprising:
   a plurality of layers of optical fiber grids, said layers being placed at various depths within said material, so that when damage occurs to said material, said optical fibers are affected, each of said layers including two orthogonal series of optical fibers arranged in a gridwork pattern;
   at least one input device for producing light and transmitting said light into one end of said optical fibers,
   at least one output device for receiving light transmitted by said optical fibers from said input device;
   a viewing device connected to said output device for observing which optical fibers transmit light;
   whereby damage to said material affects the ability of said optical fibers to transmit light from said input device to said output device so that the extent of damage to said material in each layer may be observed in said viewing device to determine in three dimensions the severity of damage.

2. A damage assessment system according to claim 1, wherein said output device is an optoelectronic device.

3. A damage assessment system according to claim 2, wherein said input device includes a light emitting diode.

4. A damage assessment system according to claim 3, wherein the optical fibers in each series are regularly spaced.

5. A damage assessment system according to claim 1, further comprising an interrogation device for sequentially examining each of said fibers and transmitting the results to said viewing device individually.

* * * * *